United States Patent
Li (10) Patent No.: US 12,457,431 B2
(45) Date of Patent: Oct. 28, 2025

(54) EVENT SENSOR AND METHOD FOR GENERATING A SIGNAL STREAM COMPRISING EVENT DATA

(71) Applicant: INIVATION AG, Zürich (CH)

(72) Inventor: Chenghan Li, Zürich (CH)

(73) Assignee: INIVATION AG, Zurich (CH)

( * ) Notice: Subject to any disclaimer, the term of this patent is extended or adjusted under 35 U.S.C. 154(b) by 91 days.

(21) Appl. No.: 18/043,290

(22) PCT Filed: Aug. 31, 2021

(86) PCT No.: PCT/EP2021/074046
§ 371 (c)(1),
(2) Date: Feb. 27, 2023

(87) PCT Pub. No.: WO2022/043587
PCT Pub. Date: Mar. 3, 2022

(65) Prior Publication Data
US 2023/0283919 A1   Sep. 7, 2023

(30) Foreign Application Priority Data
Aug. 31, 2020   (EP) .................................... 20193673

(51) Int. Cl.
*H04N 25/47*   (2023.01)
*H04N 25/772*   (2023.01)
*H04N 25/78*   (2023.01)

(52) U.S. Cl.
CPC ........... *H04N 25/47* (2023.01); *H04N 25/772* (2023.01); *H04N 25/78* (2023.01)

(58) Field of Classification Search
CPC ...... H04N 25/47; H04N 25/573; H04N 25/77; H04N 25/772; H04N 25/78; H04N 25/771; H04N 25/707; H04N 25/76
See application file for complete search history.

(56) References Cited

U.S. PATENT DOCUMENTS 7,136,097 B1 *   11/2006   Toyoda ................ H04N 25/707
                                                          348/222.1
7,728,269 B2        6/2010   Lichsteiner et al.
(Continued)

FOREIGN PATENT DOCUMENTS

| EP | 3 493 526 A1 | 6/2019 |
|---|---|---|
| KR | 10-20190102021 | 9/2019 |
| WO | WO 2018/122798 A1 | 7/2018 |

OTHER PUBLICATIONS

Amhaz, Hawraa, et al., "Smart Readout Technique designed for Logarithmic CMOS Image Sensor Including a Motion Detection Scheme," *New Circuits and Systems Conference (NEWCAS)*, 2011 IEEE 9th International, pp. 49-52 (Jun. 26, 2011).

*Primary Examiner* — Albert H Cutler
(74) *Attorney, Agent, or Firm* — Christensen, Fonder, Dardi & Herbert PLLC; John P. Fonder (57) ABSTRACT

An event sensor including a pixel array and configured to produce a signal stream comprising event data in reaction to light incident on the pixel array. The event sensor includes: for each pixel of the pixel array a photovoltaic converter and an electronic converter connected to the photovoltaic converter. The photovoltaic converter and the electronic converter are configured to produce and store a digital current pixel value, which is dependent on the intensity of light incident on the photovoltaic converter; for each pixel of the pixel array a corresponding multi-bit digital storage configured to store a previous pixel value; and a readout processor connected to the electronic converter and the multi-bit digital storage and configured to generate a pixel event value of the event data based on a pixel subtraction result of subtracting the previous pixel value from the current pixel value.

16 Claims, 5 Drawing Sheets

(56) References Cited

U.S. PATENT DOCUMENTS

| | | | |
|---|---|---|---|
| 12,081,881 B2* | 9/2024 | Tsuchimoto | G02B 5/30 |
| 2008/0297615 A1* | 12/2008 | Kagawa | H04N 3/155 |
| | | | 348/E3.018 |
| 2019/0149754 A1 | 5/2019 | Otaka | |
| 2022/0150433 A1* | 5/2022 | Fu | H04N 25/75 |
| 2022/0239851 A1* | 7/2022 | Brandli | H04N 25/47 |

* cited by examiner

EVENT SENSOR AND METHOD FOR GENERATING A SIGNAL STREAM COMPRISING EVENT DATA

RELATED APPLICATIONS

The present application is a National Phase entry of PCT Application No. PCT/EP2021/074046, filed Aug. 31, 2021, which claims priority to European Patent Application No. 20193673.9, filed Aug. 31, 2020, the disclosures of which are hereby incorporated by reference herein in their entirety.

FIELD OF THE INVENTION

The invention relates to an event sensor and method for generating a signal stream comprising event data.

BACKGROUND OF THE INVENTION

Conventional image sensors record a scene by capturing a sequence of consecutive frames in the form of digital intensity values measured by every pixel at every frame, then transferring all these digital intensity values to a receiving computer for processing. The main drawbacks of this approach include limited temporal resolution, high latency and high data redundancy.

In some machine vision tasks, such as tracking, localization and detection of moving objects, it is desirable for the machine vision algorithm to receive image sensor input with high temporal resolution and minimum latency. For such machine vision tasks, it is also undesirable to receive and process large amounts of redundant or irrelevant information. Therefore, such machine vision tasks demand a smart image sensor that has high temporal resolution, low latency, and low data redundancy. This demand is not met by a conventional image sensor.

An alternative type of image sensor, which encodes the temporal visual contrast of the scene captured by its photosensors, is proposed in U.S. Pat. No. 7,728,269 B2. By encoding the temporal contrast, temporal redundancy of the output data of the image sensor is almost eliminated, thereby producing activity-driven sparse data in the format of ON/OFF events. This means that each event consists of the sign ON/OFF and the pixel coordinates. Such an event-based temporal contrast sensor concept provides a unique combination of advantages not offered by a conventional image sensor: high dynamic range, high temporal resolution, low latency, and low data redundancy. Hence, the concept of an event-based sensor has been adopted in numerous alternative or improved designs and is also the basis of the present invention.

The design proposed in U.S. Pat. No. 7,728,269 B2 utilizes subthreshold MOSFET behavior for the logarithmic current to voltage conversion to achieve high dynamic range. Because temporal contrast is measured instead of absolute intensity, this design is immune to inter-pixel offset mismatch in the logarithmic current to voltage conversion. However, this design still suffers from inter-pixel gain mismatch in the logarithmic current to voltage conversion as well as change detection stages. Besides, this design uses a storage capacitor to store a past light-intensity-dependent signal, which is prone to various leakages that cause inaccurate output events.

SUMMARY

It is an objective of the present invention to suggest an event sensor and an accompanying imaging method, with an improved output accuracy. In addition, the suggested design should have the potential for allowing the compensation of inter-pixel offset mismatch and/or inter-pixel gain mismatch.

This objective is met according to the present invention by providing an event sensor with the features of claim 1 and a method with the features of claim 15. Further advantageous embodiments of the invention are subject of the sub-claims.

According to the invention, the event sensor comprises a pixel array and is configured to produce a signal stream comprising event data in reaction to light incident on said pixel array. In particular, the pixel array may comprise a rectangular array of W times H pixels, where W will be called a width number, referring to the number of pixels along a first direction and H will be called a height number, referring to the number of pixels along a second direction perpendicular to the first direction. The pixel array may also be referred to as having W columns of H pixels and H rows of W pixels.

Each pixel of said pixel array comprises a photovoltaic converter and an electronic converter connected to said photovoltaic converter. Said photovoltaic converter and said electronic converter are configured to produce and store a digital current pixel value, which is dependent on the intensity of light incident on said photovoltaic converter.

While the word "light" in casual context typically refers to the visible range of the electromagnetic (EM) wavelength, 400-700 nm, EM radiation in the ultraviolet (UV) and near infrared wavelengths can still cause photovoltaic effects to some extent in semiconductors, in particular silicon. The detectable wavelength range of the photovoltaic converter can be further extended, if more exotic material other than silicon is used as the photovoltaic material. Therefore, the term "EM radiation" covers more applicable cases of the invention than "light" in casual context. However, "light" in scientific context, and therefor also in the present context can refer to EM radiation of any wavelength, while in an advantageous embodiment referring to wavelength range between and including UV and infrared. It might therefore be that in the following, the expressions "light" and "EM radiation" are used interchangeably.

The event sensor further comprises for each pixel of said pixel array a corresponding multi-bit digital storage, which is configured to store a previous pixel value. While the expression "current pixel value" or "present pixel value" refers to a most recent pixel value obtained from the pair of photovoltaic converter and electronic converter, the expression "previous pixel value" or "past pixel value" refers to a pixel value obtained temporally before the current or present pixel value, in particular during a previous readout process.

Furthermore, the event sensor comprises a readout processor, which is configured to generate pixel event values for the corresponding pixels. The generated pixel event values will then be part of said event data making up the signal stream produced by the event sensor. For this purpose, the readout processor is connected to said electronic converter and its corresponding multi-bit digital storage. The readout processor generates the pixel event value based on a pixel subtraction result of subtracting said previous pixel value from said current pixel value. In particular, the pixel event value is derived from comparing the pixel subtraction result with a threshold. This means that either the pixel event value is determined to be a certain incremental value or simply a binary on/off or "1"/"0" bit value, once the pixel subtraction result surpasses or exceeds the threshold. Or, as is more advantageous, the pixel event value is determined to be the pixel subtraction result or a value dependent on the pixel subtraction result, if this pixel subtraction result is exceeding the threshold. As will be discussed further below, the pixel subtraction result may further be scaled by a gain correction factor to correct for inter-pixel gain mismatch.

The readout processor generating the pixel event value based on a pixel subtraction result means in particular that said pixel subtraction result may determine whether a pixel event value is generated at all. Thus, there will be instances when the readout processor does not generate a pixel event value, e.g. if the pixel subtraction result does not exceed a certain threshold.

According to an advantageous embodiment, the readout processor is configured to overwrite said stored previous pixel value with said current pixel value, every time a pixel event value has been generated. This means in particular that the stored previous pixel value is not overwritten, as long as the readout processor does not generate a new pixel event value. The advantage of this approach will be discussed in the following paragraphs:

Conventional, prior art motion detection techniques compare two successive frames of images that are captured from two adjacent points in time. Therefore, only relatively fast motions, or relatively fast changes in the intensity of the light impinging on the pixels, can generate significant differences between successive frames of images that are distinguishable from the intrinsic temporal noise. Although conventional motion detection techniques may be used with reduced frame rate to allow detection of relatively slow motions, doing so prevents detection of relatively fast motions.

In contrast, in the case of a threshold-dependent pixel event generation, by overwriting the previous pixel value with the current pixel value only if a pixel event is generated, the readout processor makes sure that relatively slow changes in the intensity of the light impinging on the pixel are eventually detected. In other words, the multi-bit digital storage may keep the same previous pixel value for as long as the change in the intensity of the light impinging on the pixel does not exceed the amount defined by the change detection threshold. Therefore, the readout processor may compare the current pixel value from a current point in time and the previous pixel value from a past point in time that is relatively distant from the current point in time, such that a relatively slow change in the intensity of the light impinging on the pixel is detected once the current pixel value differs from the previous pixel value by more than the change detection threshold.

In addition, advantageously, the readout processor decides whether or not to overwrite the previous pixel value with the current pixel value for each pixel individually. Therefore, the multi-bit digital storages of different pixels may store the previous pixel values from different past points in time, allowing the readout processor to detect a wide range of change rates, e.g. from relatively slow changes to relatively fast changes, in the intensity of the light impinging on these pixels.

The photovoltaic converters convert incident light into corresponding analog electric signals, the electronic converters convert these analog signals further into digital signals with the help of analog to digital converters. The photovoltaic converter is a converter that performs a photon-to-electron conversion. The photovoltaic converter may be a photodiode, in particular a partially or fully pinned photodiode (PPD). It may be configured to generate an electric current, called photocurrent, which is dependent on, in particular linearly dependent on, or proportional to, the intensity of the light impinging on the photovoltaic converter. In contrast, the electronic converter is named as such, because it solely performs conversions between different electronic signals, or electron-to-electron conversions.

The electronic converter may comprise an electronic signal converter, which can be a current-to-current converter, a current-to-voltage converter, a voltage-to-current converter, or a voltage-to-voltage converter. The output of the electronic signal converter can be dependent on its input signal linearly, logarithmically or according to some other function. The function can in particular be a compressing function, such as a logarithmic function, in order to allow compressing a much wider range of input (e.g. corresponding to 6 decades of light intensity variation) into a relatively small electronic signal range (e.g. 500 mV of voltage swing). As an example, the photovoltaic converter performs a photon-to-electron conversion, generating a photocurrent. This photocurrent is converted to an analog voltage signal in a logarithmic current-to-voltage converter, which is part of the electronic converter. Then, this analog voltage signal, which is logarithmically dependent on the incident light intensity, is converted into a digital signal or value, using an analog to digital converter, which is also a part of the electronic converter, as will be described in the following.

Thus, advantageously, the electronic converter comprises an analog to digital converter and is configured to produce said current pixel value, which is logarithmically dependent on the intensity of light incident on said photovoltaic converter.

One advantageous concept for an analog to digital converter (ADC) is the so-called single slope ADC concept. For this purpose, said ADC comprises a converter memory, which is a multi-bit memory, and is configured to receive a digital count and a reference signal synchronized with said digital count, to continuously compare an analog input signal with said reference signal, and to store a value of said digital count in said converter memory, once said reference signal becomes equal to or crosses said analog input signal. In particular, the reference signal may be a slope with a constant gradient, while the digital count is counting linearly or logarithmically synchronous with the slope of the reference signal. In the linear counting case, the ADC will produce a digital value linearly dependent on the analog input signal, while in the logarithmic counting case, the generated digital value will be logarithmically dependent on the analog input signal. Other combinations of digital count and reference signal may be possible to obtain an output value linearly or logarithmically dependent on the analog input, such as an exponentially changing reference signal and a linearly counting digital count to obtain a logarithmic analog to digital conversion. The digital count may in particular be in a Gray code format.

For the present purpose, the analog input signal provided to the ADC, in particular by the electronic signal converter, is dependent on the intensity of light incident on said photovoltaic converter. The ADC thus ensures that the converter memory will be filled with a multi-bit digital value that is dependent, in particular linearly or logarithmically, on the intensity of light impinging on the corresponding pixel or photovoltaic converter.

As explained further above, the electronic converter may comprise an electronic signal converter, such as a current to voltage converter, which converts the electronic analog signal (e.g. current) generated by the photovoltaic converter into a different electronic analog signal (e.g. voltage). Advantageously, the current to voltage converter is a logarithmic converter and the analog to digital converter is a linear converter or the current to voltage converter is a linear converter and the analog to digital converter is a logarithmic converter. As mentioned before, these two possible embodiments would ensure that the digital current pixel value produced and stored, in particular stored in the converter memory, is logarithmically dependent on the intensity of light incident on the pixel or the photovoltaic converter. While a logarithmic dependence has the advantage of a higher dynamic range, it is alternatively possible to have a different, i.e. non-logarithmic relationship between the light intensity and the produced and stored digital current pixel value, e.g. a linear dependence.

As mentioned before, the pixel array is composed of a width number (W) of pixel columns and a height number (H) of pixel rows. As each pixel has also a corresponding multi-bit digital storage for storing the previous pixel value and possibly other parameters for said pixel, the event sensor preferably also comprises a pixel parameter memory composed of W times H multi-bit digital storages. Although this is an option, the multi-bit digital storages of said pixel parameter memory do not have to be arranged in an array as is the pixel array. Furthermore, the readout processor comprises W processing blocks, each of said processing blocks being configured to process one of said W pixel columns. In other words, any processing said to be performed by the readout processor on an individual current pixel value of a pixel or a parameter value of a multi-bit digital storage or the like, may in fact be performed by the corresponding processing block.

When the readout processor consists of exactly W processing blocks, each processing block may be dedicated to processing the H pixels in one column of the pixel array. In this case, the readout processor consists of one row of W processing blocks.

Alternatively, the readout processor may have more than W number of processing blocks, in particular a multiple times of W number of processing blocks, for example 2, 3 or more times (M times) of W processing blocks, possibly arranged in M rows of W columns, where M is significantly less than H. In this alternative case, the H number of pixels of each column may be divided up into M groups, each group being processed by one processing block of the M processing blocks dedicated to said column of pixels. In other words, every M processing blocks may be dedicated to processing one column of H number of pixels. Because all processing blocks can process simultaneously, M rows of pixels can be processed simultaneously.

As yet another alternative, the readout processor may have less than W number of processing blocks, in particular a division of W by an integer number of processing blocks, for example W divided by 2, W divided by 3 or W divided by D number of processing blocks, possibly arranged in one row of W divided by D number of columns, where D is significantly smaller than W. In this alternative case, each processing block may be dedicated to processing D times H pixels in D columns of the pixel array.

Advantageously, said multi-bit digital storage is configured to further store a change detection threshold. The readout processor may then be configured to generate and/or output said pixel event value on the condition that said current pixel value differs from said previous pixel value by more than said change detection threshold. This means that a pixel event value is only generated when the intensity of the light impinging on the corresponding pixel changes by more than a specific amount, which is defined by the change detection threshold. The multi-bit digital storage may further be configured to store a past event timestamp for the corresponding pixel. Here, the readout processor may be configured to generate and/or output said pixel event value on the condition that said past event timestamp is older than a predetermined time interval. The past event timestamp is a value that represents the previous time a pixel event value has been generated by the corresponding pixel. By consulting this parameter, it can be avoided that two or more pixel event values are generated for the same pixel within a very short time period. Advantageously, both the change detection threshold and the past event timestamp are taken into account when determining whether a new pixel event value is to be generated. Instead of one change detection threshold, the multi-bit digital storage may be configured to store two separate change detection thresholds, namely a positive change detection threshold and a negative change detection threshold.

The predetermined time interval value mentioned above may be stored in each individual pixel's corresponding multi-bit storage. However, the predetermined time interval does not have to be pixel specific, i.e. one such value can apply to all pixels of the pixel array. Therefore, it may be advantageous to store the predetermined time interval value in a single separate memory, which is accessed by all processing blocks of the readout processor.

According to an advantageous embodiment, said readout processor is configured such that generating said pixel event value is one processing option among two or more processing options determined by a processing option parameter. In other words, the processing option parameter may determine whether said pixel event value is generated or whether another processing option is pursued, such as generation of a logarithmic intensity or going into a calibration mode. The expressions "processing option" and "processing mode" may be used interchangeably. Furthermore, generating the pixel event value may be regarded as processing the corresponding pixel in a temporal contrast mode.

In advantageous embodiments, the readout processor is configured to process a first pixel or all pixels in a first group of pixels of said pixel array according to a first processing option and to process a second pixel or all pixels in a second group of pixels of said pixel array according to a second processing option. In other words, the processing options of a first subset of pixels is configured to one option, while the processing options of a second subset of pixels is configured to a different option. This way, the pixel array is partitioned, and different processing modes are applied to the different partitions. More than two partitions may be generated by configuring the readout processor to process a third pixel or all pixels in a third group of pixels according to a third processing option etc.

There might be one processing option parameter for all pixels, or there might be one processing option parameter dedicated to a group of pixels. In the extreme case, each individual pixel may have its own dedicated processing option parameter. In the latter embodiment, said multi-bit digital storage corresponding to a pixel is configured to further store a processing option parameter for the corresponding pixel, wherein said readout processor is configured to process said current pixel value according to said processing option parameter for the corresponding pixel. In other words, the readout processor processes each pixel according to the pixel's processing option parameter value. This way, one or more first groups of pixels may be assigned a first processing option parameter value, while one or more second groups of pixels may be assigned a second processing option parameter value etc. As an example, which will be elaborated on further down, at a certain time, the first group of pixels may be designated for temporal contrast event detection, while the second group of pixels may be designated for logarithmic intensity frame generation. In other words, it is possible to divide the pixel array into two or more subsets of pixels, with the pixels of each subset being dedicated to a subset-specific processing option. For example, a first subset of pixels may be configured for pixel event value generation, while a second subset of pixels is configured for logarithmic intensity generation.

Advantageously, the readout processor may be configured such that one of the processing options is generating an intensity value at said pixel, which is dependent on the intensity of light incident on said photovoltaic converter of said pixel. In particular, this processing option may be to generate a logarithmic intensity at said pixel, which is a value that is logarithmically dependent on the intensity of light incident on said photovoltaic converter. This means that instead of possibly generating a pixel event value for this particular pixel, the readout processor will generate an intensity or logarithmic intensity value. This option may also be referred to as processing the corresponding pixel in a logarithmic intensity mode.

According to one preferred embodiment, the readout processor is configured such that the processing options comprise a calibration mode, wherein said current pixel value is outputted by said readout processor unprocessed. During a calibration process, which is preformed when one pixel, one or multiple groups of pixels or all pixels of the pixel array are in the calibration mode, some of the other parameters in the multi-bit digital storages of the corresponding pixel or pixels may be calculated and changed for optimal functioning of the event sensor. In particular, the change detection threshold, the gain correction factor and/or the offset compensation value may be obtained or re-obtained during such a calibration process. For this purpose, the readout processor sends the current pixel value to an external device without processing it. During the calibration process, the pixel array or a region of it may be exposed to a known light source, and the unprocessed current pixel value may then be utilized by the external device to calculate the various parameters for each pixel. While the external device may be a processor which is not part of the event sensor as described herein, it may well be a processing device which is part of a device the event sensor is built into, or even a processing device placed on the same chip and/or in the same housing as the event sensor.

Advantageously, the readout processor is configured such that the processing options comprise simultaneously generating a logarithmic intensity and a pixel event value at said pixel. As mentioned before, the logarithmic intensity is a value that is logarithmically dependent on the intensity of light incident on said photovoltaic converter, while the pixel event value is based on the pixel subtraction result of subtracting said previous pixel value from said current pixel value. In other words, both the pixel event value and the logarithmic intensity at one and the same pixel are produced by the readout processor. This processing option can be seen as a hybrid mode between the temporal contrast mode and the logarithmic intensity mode.

In a preferred embodiment, the multi-bit digital storage is configured to further store an offset compensation value, wherein said readout processor is configured to take into account said offset compensation value when generating said logarithmic intensity. In particular, the offset compensation value may be subtracted from the current pixel value to derive an offset compensated current pixel value, which can then be taken as a basis for the intensity or logarithmic intensity of a pixel.

In a further advantageous embodiment, the multi-bit digital storage is configured to further store a gain correction factor. Here, the readout processor is configured to take into account this gain correction factor when generating the pixel event value and/or the logarithmic intensity. In particular, the pixel subtraction result or the offset compensated current pixel value is multiplied with the gain correction factor to obtain the pixel event value or the logarithmic intensity.

When the multi-bit digital storage stores both the offset compensation value and the gain correction factor, then logarithmic intensity=(current pixel value−offset compensation value)*gain correction factor, and/or pixel event value=(current pixel value−past pixel value)*gain correction factor.

As mentioned before, the pixel event value is calculated on the condition that the pixel subtraction result exceeds the change detection threshold. This calculation is not carried out, if the pixel subtraction result does not exceed the change detection threshold.

The pixel parameter memory, which is assembled of the multi-bit digital storages, each of which correspond to a pixel of the pixel array, may thus be configured to store for each pixel the processing option parameter, the previous pixel value, the change detection threshold, the gain correction factor, the past event timestamp, and/or the offset compensation value. Each of these parameters have been described above. The pixel parameter memory may be accessible through an external connection such that it can be directly accessed, i.e. read-out or written into, by an external source. The external source is in particular an input source external to the event sensor. In particular, the parameters in the pixel parameter memory may be written or changed during a calibration process/procedure or calibration mode. Some pixel parameters, in particular the change detection threshold, may be adjusted or updated during operation of the event sensor, in particular during the process of generating of the pixel event values and/or the logarithmic intensities. Such an update procedure requires reading an old change detection threshold value from each individual multi-bit storage of the pixel parameter memory, calculating a new change detection threshold value and writing the new change detection threshold value back into the corresponding multi-bit storage.

According to an advantageous embodiment, the photovoltaic converter and the electronic converter of each pixel together occupy a joint physical region or volume in said pixel array. On the other hand, the readout processor and the pixel parameter memory may be placed in different regions or volumes away from the pixel array. Herein, the expression "volume" refers to a spatial or three-dimensional (3D) region in the semiconductor device.

If the pixels are arranged in the rectangular pixel array of W columns and H rows, each column or multiple columns of pixels may share one or multiple common processing block(s) of the readout processor. It might therefore be referred to as a column-parallel readout processor, which is configured to process one row, multiple rows or part of one row of pixels of the pixel array in parallel. The processing block(s) of the corresponding column(s) may be placed on the event sensor die at the end of said column(s) and may be connected to each pixel of said column(s) by way of a shared bus, which will be called an ADC bus in the following. For example, in case the pixel outputs a 12-bit current pixel value, the ADC bus may be 12-bit wide. In particular, the ADC bus may be connected to the output of the analog to digital converter, accessing the converter memory of each pixel. Preferably, if the ADC is implemented using a digital count, the digital count may be supplied to the ADCs of each column via the same ADC bus. In this case, the ADC bus may be utilized for both the purpose of the supply of the digital count and the purpose of the readout of the current pixel values.

Similarly, the multi-bit digital storages of the pixel parameter memory may also be arranged in an array of W columns and H rows of multi-bit digital storages, or they may in some other way be configured to be accessed one row, multiple rows or part of one row at a time by the readout processor. Then, also here each readout processing block may be connected to one column, multiple columns, or part of one column of multi-bit digital storages. Thus, one column, multiple columns or part of one column of multi-bit digital storages may also share one common parameter bus, e.g. a 75-bit parameter bus, if the total size of all parameters of one multi-bit digital storage is 75-bit. In practice a parameter bus to transport all parameters of one multi-bit digital storage at once, such as a 75-bit parameter bus, may be too wide. In this case, the parameter bus may have a smaller width, such as a 38-bit or narrower bus, which then takes two or more clocks to transfer all parameters of one multi-bit digital storage.

As an alternative to the implementation of the readout of the current pixel values via the ADC bus, the pixels of one column or multiple columns may be read out by the corresponding processing block(s) via a shift register system. During readout, the converter memories within each column may be connected to each other, forming a chain of shift registers. The current pixel values stored in the converter memories will then be moved one pixel further at a time towards the corresponding processing block(s) until all current pixel values of a column have been read by said processing block(s). This is a destructive readout process, where the stored current pixel values in the converter memories will be deleted or overwritten. To also implement such a shift register system for the reading and writing of the pixel parameter memory, a separate chain of shift registers may be needed. It is therefore more efficient to read from and write into the pixel parameter memory by way of the parameter bus described above.

During readout, a readout controller selects which row(s) or part of a row of the pixel array can access the shared ADC bus, and which (corresponding) row(s) or part of row of the pixel parameter memory can access the shared parameter bus.

It is possible and advantageous to fabricate the event sensor on a single die, such that the pixel array, the pixel parameter memory and the processing blocks are all physically arranged on the same die. However, with present-day technology it may be more practical to fabricate this event sensor using a 2-die stacked structure, with the pixel array fabricated on a sensor die and the pixel parameter memory and the processing blocks fabricated on a logic die, wherein the sensor die is stacked and bonded on top of the logic die. In future embodiments, it may be advantageous to utilize a 3-die stacked structure: The first die carries an array of the photovoltaic converters connected or paired with the electronic signal converters, or an array of the photovoltaic converters connected or paired with part of the electronic signal converters; the second die carries an array of the ADCs, or an array of part of the electronic signal converters connected or paired with the ADCs; and the third die carries the pixel parameter memory and the processing blocks.

According to a further aspect of the invention, a method for producing a signal stream comprising event data in reaction to light incident on a pixel array is suggested. The method comprises the following steps:

produce and store a digital current pixel value, which is dependent on the intensity of light incident on a photovoltaic converter of each pixel of said pixel array by an electronic converter connected to said photovoltaic converter;

provide for each pixel of said pixel array a previous pixel value stored in a multi-bit digital storage corresponding to said pixel; and generate a pixel event value of said event data based on a pixel subtraction result of subtracting said previous pixel value from said current pixel value by a readout processor connected to said electronic converter and said multi-bit digital storage.

Any features and advantages described herein in connection with the event sensor may also apply analogously to said method.

BRIEF DESCRIPTION OF THE DRAWINGS

Some examples of embodiments of the present invention will be explained in more detail in the following description with reference to the accompanying schematic drawings, wherein.

DETAILED DESCRIPTION

Figure 1:
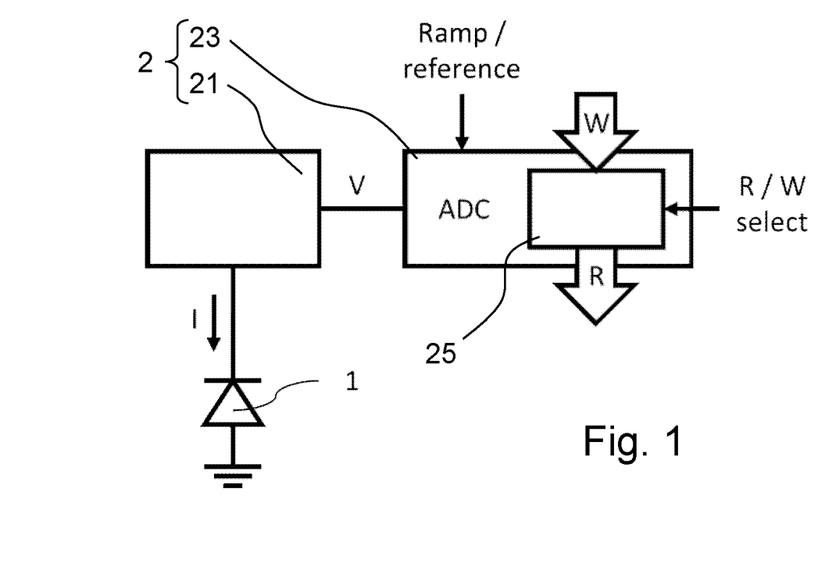
FIG. 1 shows a block diagram of a pixel according one embodiment.

FIG. 1 shows a block diagram of a pixel according one preferred embodiment. Incident light is detected by the photovoltaic converter 1, which here is a photodiode 1. The photodiode generates a current I, a photocurrent, which is dependent on the intensity of the light incident on the active region of the photodiode 1. A current to voltage converter 21 transforms the photocurrent I to a voltage V. This conversion can either be a linear conversion, where the voltage is linearly dependent on or proportional to the photocurrent. Or it can be a logarithmic conversion, where the voltage is logarithmically dependent on the photocurrent. Other conversion functions may be possible but less practical.

The current to voltage converter 21 and an analog to digital converter (ADC) 23 together form an electronic converter 2, which together with the photodiode 1 produce a digital current pixel value. The ADC 23 may be a linear converter, where its output digital value is linearly dependent on its input analog value. Alternatively, the ADC 23 may be a logarithmic converter, where its output digital value is logarithmically dependent on its input analog value. Since advantageously the digital current pixel value generated by the combination of the current to voltage converter 21 and the ADC 23 is logarithmically dependent on the incident light or the photocurrent, a linearly converting current to voltage converter 21 may be combined with a logarithmically converting ADC 23. Conversely, a logarithmically converting current to voltage converter 21 may be combined with a linearly converting ADC 23 to achieve a similar result.

Figure 2:
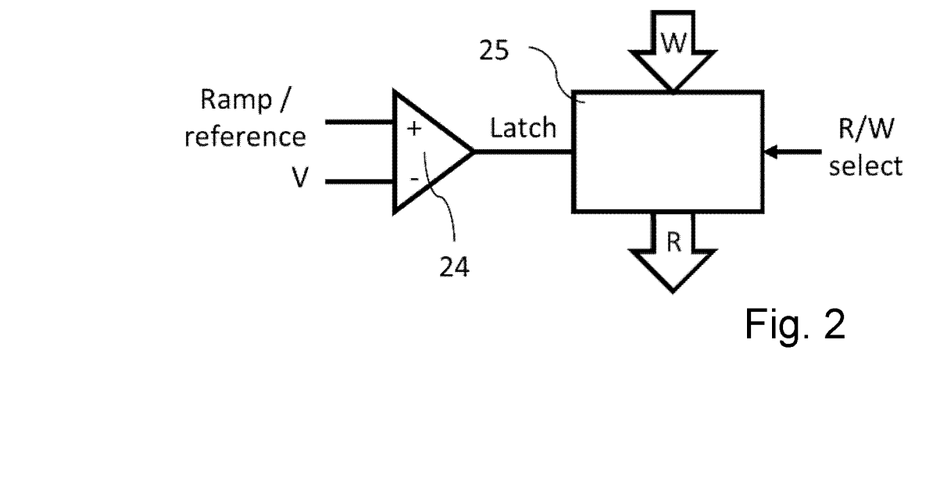
FIG. 2 shows a block diagram of a single slope analog to digital converter used in the pixel of FIG. 1.

The ADC 23 shown here is a single slope analog to digital converter, the function of which is described in more detail with reference to FIG. 2. Central part of the single slope analog to digital converter 23 is a converter memory 25. Once the analog to digital conversion is complete, its output digital value, i.e. the current pixel value, is stored in the converter memory 25. A digital count, which is a multi-bit digital value being counted up or down is supplied to the converter memory 25 via a path shown as an arrow labelled with a "W". Furthermore, a reference signal, which is a ramp with a positive or negative slope is supplied to a comparator 24. The other input of the comparator 24 is connected to the output of the current to voltage converter 21 to obtain its input analog value to be converted, which here is the voltage V. Once the ramping reference signal crosses the voltage V, the comparator 24 generates a signal, which is used as a latch signal for the converter memory 25. Upon receiving the latch signal, the converter memory 25 stores the current value of the digital count supplied to it. The value stored in the converter memory 25 represents the current pixel value and may be read out afterwards via a path indicated by the arrow bearing the letter "R". Whether the converter memory 25 is in a write "W" mode or a read "R" mode is determined by an R/W select signal supplied to the converter memory 25.

Whether the ADC 23 implements a linear or a logarithmic conversion, can be determined by the relationship between the reference signal and the digital count. For example, an exponentially ramping reference signal in combination with a linearly increasing or decreasing digital count may allow for the logarithmic conversion. However, advantageously, the reference signal is a single slope, i.e. a linearly ramping signal with a constant slope, while the linear or logarithmic conversion can be achieved by a linearly or logarithmically increasing or decreasing digital count, respectively.

The reference signal is a peripherally generated global reference voltage. The digital count is a global bit pattern from a peripheral counter supplied through a shared digital bus. The reference signal voltage starts to sweep from a starting voltage level to an end voltage level. At the same time, the peripheral counter starts counting. Depending on whether it is a linear or a logarithmic counting, the bit pattern value of the digital count increases or decreases linearly or logarithmically with time. To avoid storing spurious bit pattern values when the latch signal is generated during the transition of two successive counts, the bit pattern of the digital count is preferably in Gray code format. The converter memory 25 can be based on either SRAM or DRAM circuits.

The ADC 23 resolution should be determined after taking into consideration the target contrast sensitivity threshold and dynamic range of the event sensor, as well as the desired gain correction allowance and offset tolerance to cope with inter-pixel mismatches. The purpose of the gain correction allowance is to later correct the inter-pixel gain mismatch introduced mainly by the current to voltage converter 21. The purpose of the offset tolerance is to accommodate the inter-pixel offset mismatch of the output of the current to voltage converter 21, in other words, to ensure that the input analog value of the ADC 23, which is the voltage V, falls within the supported input range of the ADC 23. Putting these considerations together, the resolution of the ADC 23 can be determined as:

$$ADC \text{ resolution[bit]} \geq$$
$$\log_2\left(\log_{(1+Contrast\ sensitivity\ threshold)}\left(10^{\frac{Dynamic\ range[dB]}{20}}\right)\right) +$$
$$\text{Gain correction allowance[bit]} + \text{Offset tolerance[bit]}$$

For example, to achieve a contrast sensitivity threshold of 15% across 120 dB of dynamic range, while allowing a 4-bit gain correction and a 1-bit offset tolerance, the ADC 23 should have at least a 12-bit resolution.

Figure 3A:
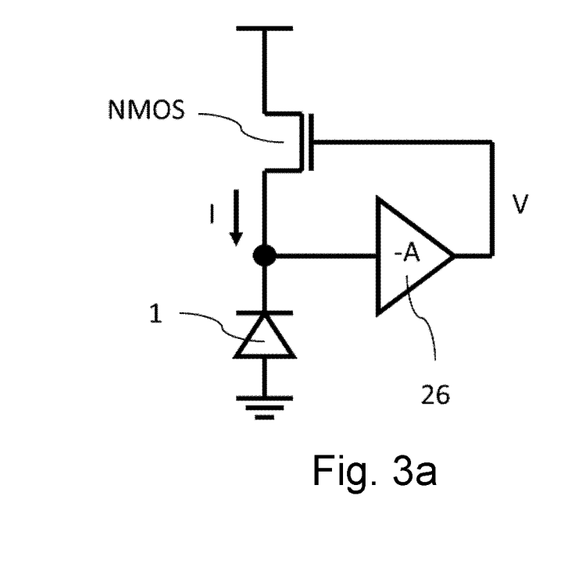
FIG. 3a-3c show three different circuit diagrams of logarithmic current to voltage converters according to three different embodiments.
Figure 3B:
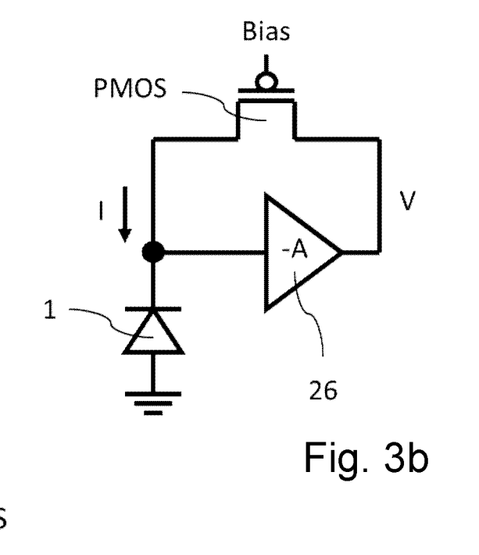
Figure 3C:
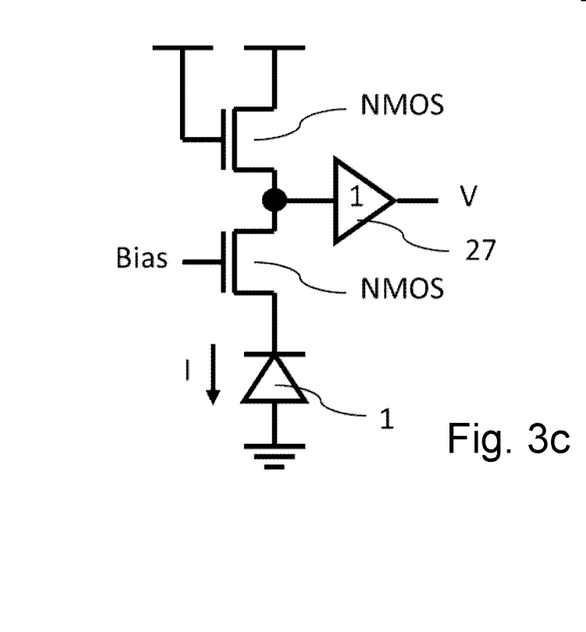

The implementation of a logarithmic current to voltage converter according to three preferred embodiments is shown in FIG. 3a-3c. By utilizing subthreshold behavior of either an N type MOSFET (NMOS) or P type MOSFET (PMOS), high dynamic range and low current to voltage conversion latency are achieved. In the circuit shown in FIG. 3a, an inverting amplifier 26 is connected between the source and the gate of an NMOS. In the circuit according to FIG. 3b, the inverting amplifier 26 is connected between the source and the drain of a PMOS. In both circuits, the generated voltage V is supplied at the output of the inverting amplifier 26. In the circuit of FIG. 3c, the photodiode 1 used is a pinned photodiode. It is connected in series to two NMOS. A buffer 27 is connected with its input to the source/drain connection between the two NMOS and supplies the voltage V at its output. In FIG. 3a, a bias voltage is supplied to the inverting amplifier 26. In FIG. 3b, a bias voltage is supplied to the inverting amplifier 26 and another possibly separate bias voltage is supplied to the gate of the PMOS. In FIG. 3c, a bias voltage is supplied to the buffer 27 and another possibly separate bias voltage is supplied to the gate of the bottom NMOS. The drain of the NMOS in FIG. 3a and the drain and gate of the top NMOS in FIG. 3c are connected to the supply voltage(s) of the circuit.

Figure 4:
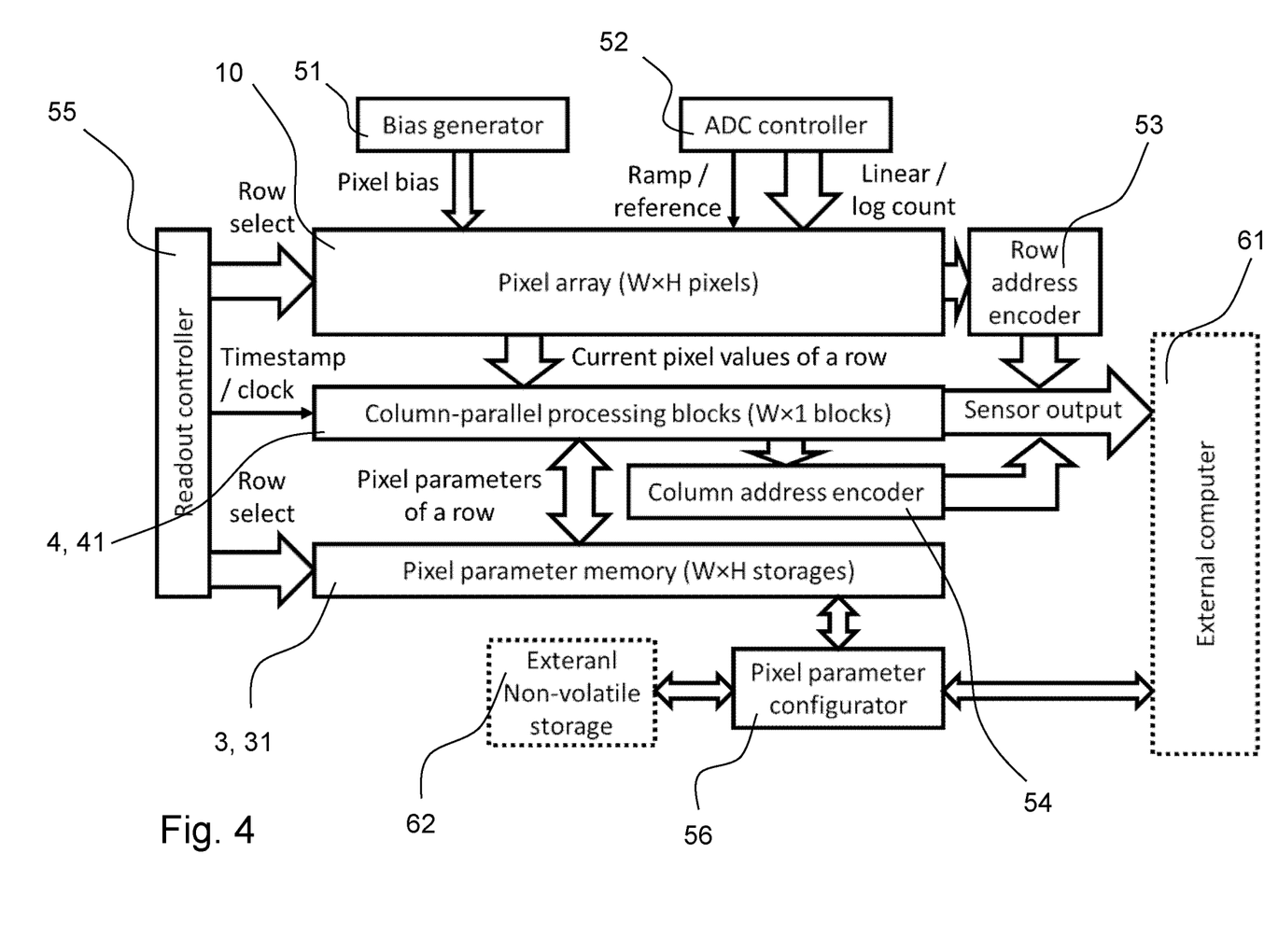
FIG. 4 shows a block diagram of an event sensor according to a preferred embodiment.

FIG. 4 shows a block diagram of an event sensor according to a preferred embodiment. The central elements of the event sensor are the pixel array 10 with W columns by H rows of pixels, the pixel parameter memory 3 with W columns by H rows of multi-bit digital storages 31, and the readout processor 4 with W column-parallel processing blocks 41. Thus, there is a one-to-one mapping between each pixel of the pixel array 10 and a corresponding multi-bit digital storage 31 of the pixel parameter memory 3. In addition, a bias generator 51 provides pixel bias voltage(s) to the pixel array 10 for biasing the current to voltage converters 21, shown in the FIG. 3a-3c. An ADC controller 52 generates the ramp/reference signal and the linear or logarithmic digital count in grey code format and provides them to the pixel array 10 for the in-pixel ADCs 23.

The readout processor 4 reads the current pixel values from the pixel array 10 and reads/writes pixel parameters from/to the pixel parameter memory 3. The pixel parameter memory 3 is preferably SRAM-based. The read and write operations between the pixel array 10, the readout processor 4 and the pixel parameter memory 3 are coordinated by a readout controller 55. The pixel parameter memory 3 can be loaded from an external non-volatile storage 62 (e.g. flash memory) and configured by an external computer 61 via a pixel parameter configurator 56.

Each multi-bit digital storage 31 of the pixel parameter memory 3 stores the pixel parameters of its corresponding pixel. The pixel parameters include a processing option parameter, a previous pixel value, one or two (separate positive and negative) change detection threshold(s), a gain correction factor, and may additionally include a past event timestamp, as well as an offset compensation value or offset compensator.

The processing option is pixel-specific and determines how the processing block 41 operates on the corresponding pixel. A pixel has 5 processing options or processing modes, determined by the processing option parameter: (1) temporal contrast detection, (2) temporal contrast detection and measurement, (3) logarithmic intensity measurement, (4) temporal contrast detection and logarithmic intensity measurement, and (5) calibration. In the temporal contrast detection mode and the temporal contrast detection and measurement mode, a pixel event value may be generated (depending on the temporal contrast) at the corresponding pixel. In the logarithmic intensity measurement mode, a logarithmic intensity at the corresponding pixel is generated. The temporal contrast detection and logarithmic intensity measurement mode is a hybrid mode, wherein both the pixel event value and the logarithmic intensity may be generated (depending on the temporal contrast) at the corresponding pixel. In the calibration mode, the event sensor is calibrated or partly calibrated by making measurements under predetermined environmental parameters such as temperature and during exposure of the pixel array to radiation with predetermined parameters such as intensity, wavelength etc., and consequently obtaining or adjusting the pixel parameters of some or all pixels.

The change detection threshold(s), the gain correction factor and the offset compensation value are all pixel-specific to allow inter-pixel gain and offset mismatch correction and compensation. Their values can be obtained through a one-time calibration procedure.

It may be assumed that each multi-bit digital storage 31 of the pixel parameter memory 3 stores all the above-mentioned pixel parameters and each parameter is 12-bit, except for the processing option parameter, which is 3-bit. Therefore, each multi-bit digital storage 31 will have a total of 75 bits. In this case, the silicon area of the entire pixel parameter memory 3 serving a 1 Megapixel pixel array is less than 10 mm$^2$ when using state-of-the-art 28 nm SRAM technology.

The event sensor can switch among several different operation modes by configuring the processing options of the pixels. The event sensor has two basic operation modes: a temporal contrast event mode and a logarithmic intensity frame mode, which will be described in more detail in the following with reference to FIGS. 5 and 6. In the temporal contrast event mode, the row address encoder 53, column address encoder 54 and readout processor 4 all contribute to the event sensor output. In the logarithmic intensity frame mode, only the readout processor 4 contributes to the event sensor output. Besides these two basic operation modes, the event sensor can also operate in various temporal contrast and logarithmic intensity hybrid modes. Lastly, the event sensor has a calibration mode.

Temporal Contrast Event Mode

The temporal contrast event mode operation starts with a pixel-parallel conversion of the light-intensity-dependent analog voltage V into the current pixel value and storing the current pixel value in the converter memory of the in-pixel ADC in a synchronous global-shutter fashion. The current pixel values of the entire pixel array are collectively called a frame.

Then, the readout processor reads the current pixel values from the pixel array row by row. Simultaneously, when each row of the pixel array is being read, the readout processor also reads the corresponding pixel parameters of the same row of pixels from the pixel parameter memory. In other words, the current pixel values and the corresponding pixel parameters of the same row of pixels are received by the readout processor at the same time. The information transfer between the pixel array, the pixel parameter memory and the readout processor is coordinated by the readout controller.

Figure 5:
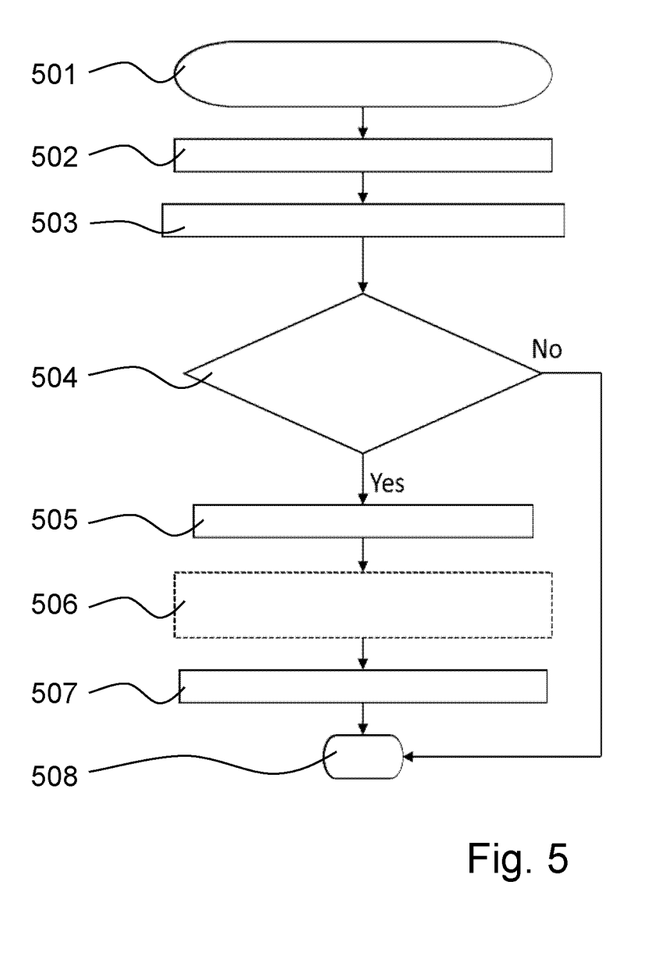
FIG. 5 shows a flow chart of steps performed by the readout processor in a temporal contrast event mode according to a preferred embodiment.

In the temporal contrast event mode, the processing options of all pixels are configured to (1) temporal contrast detection, or (2) temporal contrast detection and measurement. Therefore, each processing block performs the following processing steps to decide whether to output a temporal contrast event from the corresponding pixel, as shown in the flow chart in FIG. 5:

1. Receive a current pixel value and corresponding pixel parameters of the same pixel 501.
2. Convert the current pixel value from Gray code into binary format 502.
3. Compute a signed difference between the current and previous pixel values 503.
4. Decide if the signed difference exceeds the positive or negative change detection threshold of the corresponding pixel, and optionally if the past event timestamp meets a condition (e.g. older than 1 ms with respect to the current timestamp) 504:
   a. If yes:
      i. Request for a temporal contrast event output 505.
      ii. If the processing option is (2) temporal contrast detection and measurement: compute a gain-corrected temporal contrast magnitude by multiplying the signed difference with the gain correction factor of the corresponding pixel 506.
      iii. Update the corresponding pixel parameters, including overwriting the previous pixel value with the current pixel value, and optionally overwriting the past event timestamp with a current timestamp 507.
   b. If no: perform no action.
5. End of processing 508.

When the readout processor finishes processing one row of the frame, those processing blocks with a request for a temporal contrast event output will communicate their corresponding information as the event sensor's temporal contrast event output, preferably via a high-speed token-based communication system such as described in EP3561685A1. Each temporal contrast event contains a pixel address obtained from the row and column address encoders, the sign of the temporal contrast, the current timestamp (possibly shared by all temporal contrast events from the same frame), and optionally also the gain-corrected temporal contrast magnitude. The readout processor then proceeds to read and process the next row of the frame. After the readout processor finishes reading and processing the entire frame, the event sensor may repeat the abovementioned operation steps on a next frame.

The information from the pixel array and the pixel parameter memory required by the readout processor are all digital and have fast access time on the order of 10 ns. The processing blocks perform mainly only addition/subtraction and multiplication operations, which can be achieved by combinational logic. Therefore, a pipelined row-by-row reading and processing of one frame containing 1000 rows only introduces an additional latency on the order of 10 μs.

Logarithmic Intensity Frame Mode

The logarithmic intensity mode or logarithmic intensity frame mode operation also starts with capturing a frame of current pixel values and storing the frame in the converter memories of the in-pixel ADCs in a synchronous global-shutter fashion.

Then, the readout processor reads the current pixel values and the corresponding pixel parameters of the same row of pixels in a row-by-row fashion, coordinated by the readout controller. Up to this point the logarithmic intensity frame mode operation is identical to the temporal contrast event mode. The main difference between the logarithmic intensity frame mode and the temporal contrast event mode occurs in the processing blocks.

Figure 6:
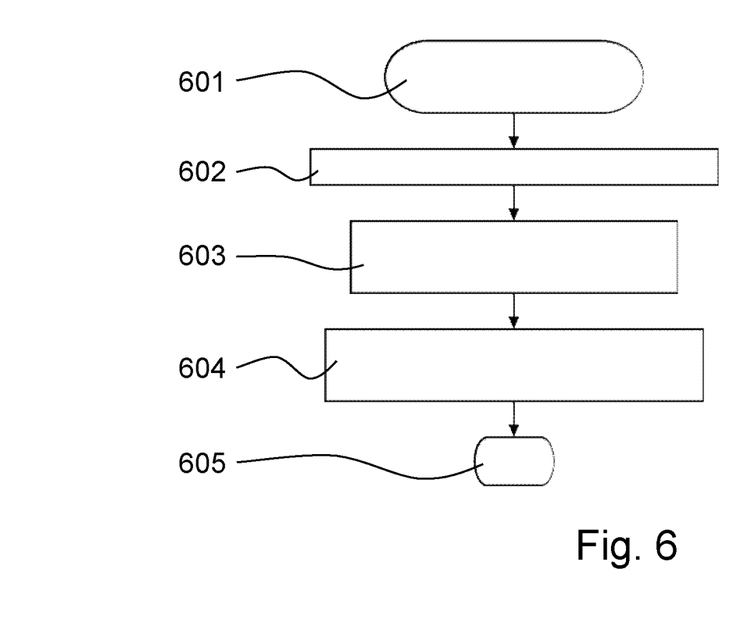
FIG. 6 shows a flow chart of steps performed by the readout processor in a logarithmic intensity mode according to a preferred embodiment.

In the logarithmic intensity frame mode, the processing options of all pixels are configured to (3) logarithmic intensity measurement. Therefore, each processing block performs the following processing steps to correct the inter-pixel gain and offset mismatch in the current pixel value, as shown in the flow chart in FIG. 6:

1. Receive a current pixel value and corresponding pixel parameters of the same pixel 601.
2. Convert the current pixel value from Gray code into binary format 602.
3. Compute an offset-compensated pixel value by subtracting the offset compensator of the corresponding pixel from the current pixel value 603.
4. Compute a final offset-compensated and gain-corrected pixel value by multiplying the offset-compensated pixel value with the gain correction factor of the corresponding pixel 604.
5. End of processing 605.

When the processing blocks finish processing one row of the frame, their final offset-compensated and gain-corrected pixel values, reflecting the logarithmic intensity measurements of their corresponding pixels, are communicated as the event sensor's logarithmic intensity frame output. Preferably, the high-speed token-based communication system used in the temporal contrast event mode may also serve the event sensor output in the logarithmic intensity frame mode, where all processing blocks communicate the logarithmic intensity measurements of their corresponding pixels in sequence, while the pixel address information may be discarded. Alternatively, the event sensor output in the logarithmic intensity frame mode can employ a standard shift-register-based communication system. The readout processor then proceeds to read and process the next row of the frame. After the readout processor finishes reading and processing the entire frame, the event sensor may repeat the abovementioned operation steps on a next frame.

Temporal Contrast and Logarithmic Intensity Hybrid Mode Variant 1

A temporal contrast and logarithmic intensity hybrid mode variant 1 is almost identical with the temporal contrast event mode, with the exception of a few processing steps performed by the processing blocks.

Figure 7:
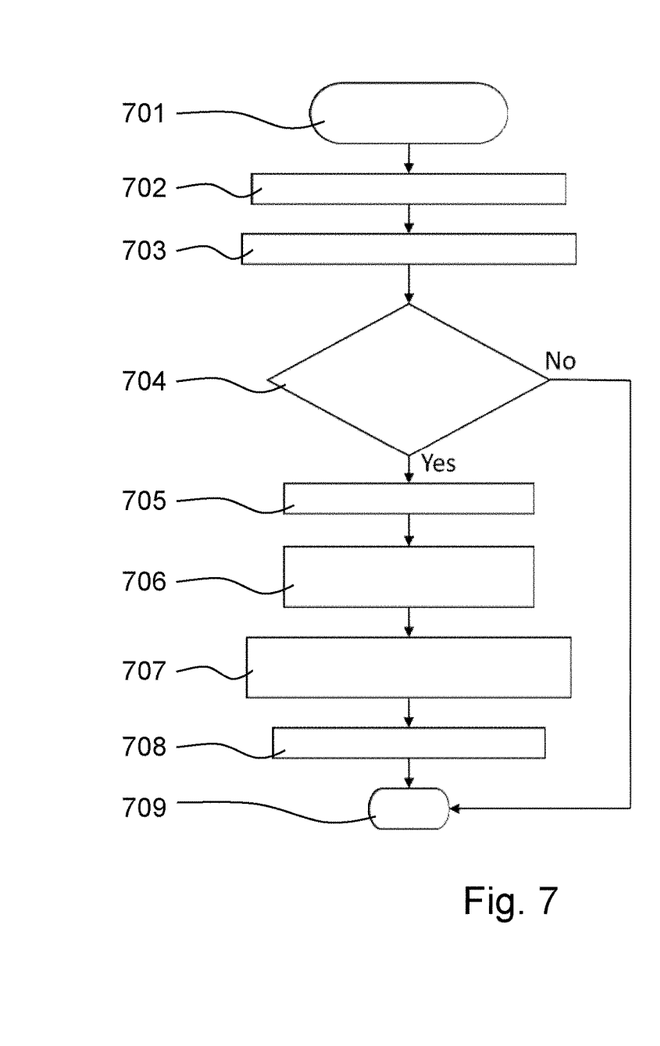
FIG. 7 shows a flow chart of steps performed by the readout processor in a temporal contrast and logarithmic intensity hybrid mode according to a preferred embodiment.

In the temporal contrast and logarithmic intensity hybrid mode variant 1, the processing options of all pixels are configured to (4) temporal contrast detection and logarithmic intensity measurement. Therefore, as shown in the flow chart in FIG. 7, each processing block performs the following processing steps to decide whether to output a temporal contrast event as well as a logarithmic intensity measurement from the corresponding pixel:

1. Receive a current pixel value and corresponding pixel parameters of the same pixel 701.
2. Convert the current pixel value from Gray code into binary format 702.
3. Compute a signed difference between the current and previous pixel values 703.
4. Decide if the signed difference exceeds the positive or negative change detection threshold of the corresponding pixel, and optionally if the past event timestamp meets a condition (e.g. older than 1 ms with respect to the current timestamp) 704:
    a. If yes:
        i. Request for a temporal contrast event output 705.
        ii. Compute an offset-compensated pixel value by subtracting the offset compensator of the corresponding pixel from the current pixel value 706.
        iii. Compute a final offset-compensated and gain-corrected pixel value by multiplying the offset-compensated pixel value with the gain correction factor of the corresponding pixel 707.
        iv. Update the corresponding pixel parameters, including overwriting the previous pixel value with the current pixel value, and optionally overwriting the past event timestamp with a current timestamp 708.
    b. If no: perform no action.
5. End of processing 709.

When the readout processor finishes processing one row of the frame, those processing blocks with a request for a temporal contrast event output will communicate their corresponding information as the event sensor's temporal contrast and logarithmic intensity hybrid output, preferably via the same high-speed token-based communication system used in the temporal contrast event mode. Each temporal contrast event then contains a pixel address obtained from the row and column address encoders, optionally the sign of the temporal contrast, the current timestamp (possibly shared by all temporal contrast events from the same frame), and the offset-compensated and gain-corrected pixel value reflecting the logarithmic intensity measurement of the corresponding pixel. The readout processor then proceeds to read and process the next row of the frame. After the readout processor finishes reading and processing the entire frame, the event sensor may repeat the abovementioned operation steps on a next frame.

Other Temporal Contrast and Logarithmic Intensity Hybrid Mode Variants

Because the processing option is pixel-specific, the processing options of a subset of pixels can be configured to one option, while the processing options of another subset of pixels is configured to a different option. This approach will be discussed in more detail in the following with reference to FIG. 8*a*-8*c*, which schematically show the pixel array as a rectangular region divided into various subsets of pixels.

Figure 8A:
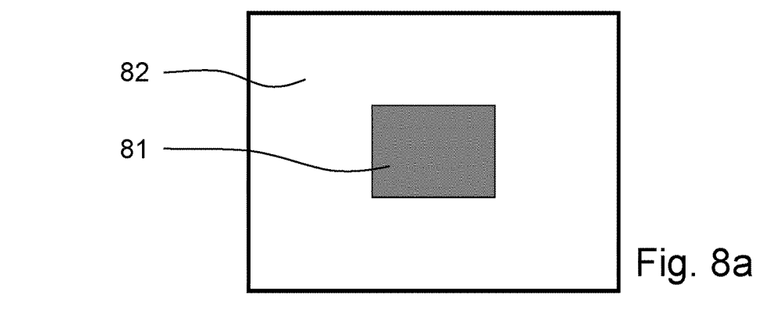
FIG. 8a-8c show schematically three different possible manners for partitioning the pixel array and to apply different processing modes to the different partitions.

In a first example shown in FIG. 8*a*, the processing options of a first subset 81 of pixels at the center of the pixel array can be configured to (3) logarithmic intensity measurement, while the processing options of a second subset 82 of pixels, which correspond to the rest of the pixels in the pixel array, are configured to (2) temporal contrast detection and measurement.

Figure 8B:
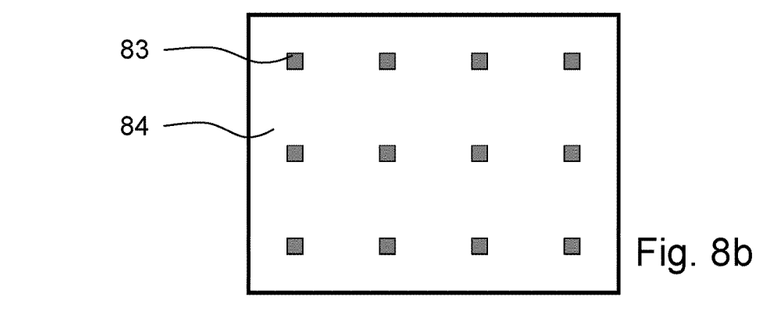

In a second example shown in FIG. 8*b*, the processing options of a third subset 83 of pixels interspersed in the pixel array can be configured to (3) logarithmic intensity measurement, while the processing options of a fourth subset 84, corresponding to the rest of the pixels in the pixel array, are configured to (2) temporal contrast detection and measurement.

Figure 8C:
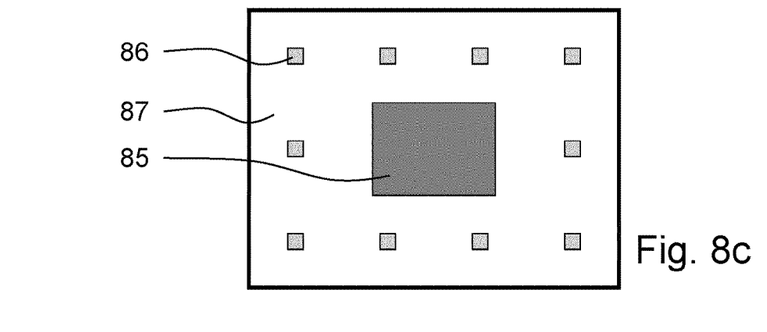

In a third example shown in FIG. 8c, the processing options of a fifth subset 85 of pixels at the center of the pixel array can be configured to (3) logarithmic intensity measurement, while the processing options of a sixth subset 86 of pixels interspersed in the pixel array are configured to (4) temporal contrast detection and logarithmic intensity measurement, and the processing options of a seventh subset 87, corresponding to the rest of the pixels in the pixel array are configured to (2) temporal contrast detection and measurement.

There can be many more different ways to configure the processing options of the pixel array, using different combinations of the pixel subsets and their processing options. In various such temporal contrast and logarithmic intensity hybrid modes, the event sensor output is preferably supported by the same high-speed token-based communication system used in the temporal contrast event mode. The processing options of the pixel array are configured by the external computer. Therefore, the external computer can decode the event sensor's output in various such hybrid modes based on the known processing option configuration of the pixel array.

Calibration Mode

The pixel-specific change detection threshold(s), the gain correction factor, and the offset compensation value may be obtained by way of a one-time calibration procedure. In the calibration mode, the processing options of all pixels are configured as the calibration option. Therefore, the readout processor communicates the current pixel values without any processing as the event sensor's calibration mode output, via the same communication scheme used in the logarithmic intensity frame mode.

To obtain the pixel-specific change detection threshold(s) and the gain correction factor, all pixels are exposed to a uniform light source, one time at a low illumination level, and another time at a high illumination level. The event sensor captures a first frame at the low illumination level, called low frame, and outputs the first frame of current pixel values, called low pixel values. The event sensor also captures a second frame at the high illumination level, called high frame, and outputs the second frame of current pixel values, called high pixel values. These two steps are repeated a number of times (e.g. 10, 100 or more times) in no particular chronological order. As a result, the event sensor has produced, for each pixel, a number of low pixel values (e.g. 10, 100 or more low pixel values) and a number of high pixel values (e.g. 10, 100 or more high pixel values).

To minimize the effect of temporal noise in the event sensor, a temporal average low pixel value and a temporal average high pixel value are computed for each pixel as:

Temporal average low pixel value (of a pixel) =
$$\frac{\sum \text{All low pixel values(of this pixel)}}{\text{Total number of low frames}}$$

Temporal average high pixel value (of a pixel) =
$$\frac{\sum \text{All high pixel values (of this pixel)}}{\text{Total number of high frames}}$$

Then, a pixel value difference is computed for each pixel as:

Pixel value difference (of a pixel)=Temporal average high pixel value (of this pixel)−Temporal average low pixel value (of this pixel)

And an array average pixel value difference is computed as:

Array average pixel value difference =
$$\frac{\sum \text{All pixel values differences (of all pixels in the pixel array)}}{\text{Total number of pixels in the array}}$$

Hence, the gain correction factor for each pixel can be computed as:

Gain correction factor (of a pixel) =
$$\frac{\text{Array average pixel value difference}}{\text{Pixel value difference (of this pixel)}}$$

The change detection threshold for each pixel can be computed as:

Change detection threshold (of a pixel) =
$$\frac{\text{Pixel value difference (of this pixel)}}{\log_{(1+Contrast\ sensitivity\ threshold)}\left(\frac{\text{High illumination level}}{\text{Low illumination level}}\right)}$$

For example, if the low illumination level is 0.1 lux, the high illumination level is 100 k lux, and the array average pixel value difference is 2000, then the gain correction factor for a pixel with the pixel value difference of 1800 should be about 1.1. If the target contrast sensitivity threshold is 15%, then the change detection threshold of this pixel should be about 18.

To further obtain the pixel-specific offset compensator, the event sensor captures a third frame in darkness, called dark frame, and outputs the third frame of current pixel values, called dark pixel values. This step is repeated a number of times (e.g. 10, 100 or more times). As a result, the event sensor has produced, for each pixel, a number of dark pixel values (e.g. 10, 100 or more dark pixel values).

To minimize the effect of temporal noise in the event sensor, a temporal average dark pixel value is computed for each pixel as its offset compensator:

Offset compensator(of a pixel) = $$\frac{\sum \text{All dark pixel values (of this pixel)}}{\text{Total number of dark frames}}$$

It is worth noting that, because the dark pixel values vary with temperature and may also vary with the bias setting of the pixel front-end electronic signal converter, here the current to voltage converter, the offset compensation value calibration result obtained at one particular operating temperature and using one particular pixel bias setting is the most effective at about the same operating temperature and using about the same pixel bias setting. Therefore, it is recommended to calibrate the event sensor for the offset compensator at one (or several) most expected operating temperature(s) using one (or several) most likely pixel bias setting(s) for a use case.

During the calibration procedure, the pixel-specific change detection threshold(s), the gain correction factor, and the offset compensation values are computed by the external computer, then written into the external nonvolatile storage and loaded upon power-up into the pixel parameter memory via the pixel parameter configurator for subsequent event sensor operation.

Pixel Parameter Adjustment During Operation

During event sensor operation, i.e. all the other operation modes outside of the calibration mode for the event sensor, there are occasions when some of the pixel parameters need to be adjusted by the external computer. Below are a few examples:

To switch the event sensor's operation mode, the processing options of the pixel array need to be re-configured. A new procession option configuration is determined by the external computer and written into the pixel parameter memory as well as the external nonvolatile storage via the pixel parameter configurator.

If the pixel bias setting and/or the operating temperature changes while the event sensor operates in the logarithmic intensity frame mode or a temporal contrast and logarithmic intensity hybrid mode, a new set of the offset compensation values for the pixel array, corresponding to the new pixel bias setting and/or the new operating temperature, is needed for the event sensor to achieve optimal output accuracy. Preferably, several sets of the offset compensation values for the pixel array are obtained via calibration at several expected pixel bias settings and operating temperature ranges, and stored in the external nonvolatile storage. The set that corresponds to the new bias setting and/or the new operating temperature range is selected by the external computer and written into the pixel parameter memory via the pixel parameter configurator.

When the event sensor operates in the temporal contrast event mode or a temporal contrast and logarithmic intensity hybrid mode, it is sometimes desirable to adjust the contrast sensitivity threshold. To do so, the pixel-specific change detection threshold(s) in the pixel parameter memory are updated via the pixel parameter configurator. A new change detection threshold for each pixel is computed as:

$$\text{New change detection threshold (of a pixel)} = \text{Old change detection threshold (of this pixel)} \cdot \log_{(1+Old\ contrast\ sensitivity\ threshold)}(1 + \text{New contrast sensitivity threshold})$$

For example, if the old contrast sensitivity threshold is 15%, the old change detection threshold of a pixel is 18, and the new contrast sensitivity threshold to achieve is 30%, then the new change detection threshold of this pixel should be 34.

During the adjustment of the pixel-specific change detection threshold(s), the old change detection threshold(s) of each pixel are sent by the pixel parameter configurator to the external computer. For each old change detection threshold, the external computer computes the corresponding new change detection threshold based on the old and new contrast sensitivity threshold targets. The resulting new change detection threshold(s) of each pixel are then written back into the pixel parameter memory as well as the external nonvolatile storage via the pixel parameter configurator.

REFERENCE NUMERALS

10 pixel array
1 photovoltaic converter, photodiode, PPD
2 electronic converter
21 electronic signal converter, current to voltage converter
23 analog to digital converter
24 comparator
25 converter memory
26 inverting amplifier
27 buffer
3 pixel parameter memory, having
31 multi-bit digital storages
4 readout processor, with
41 processing blocks
51 bias generator
52 ADC controller
53 row address encoder
54 column address encoder
55 readout controller
56 pixel parameter configurator
61 external computer
62 external non-volatile storage

The invention claimed is:

1. An event sensor comprising:
a pixel array;
a photovoltaic convert er for each pixel of the pixel array;
an electronic converter for each pixel of the pixel array, said electronic converter connected to said photovoltaic converter;
a multi-bit digital storage for, and corresponding to, each pixel of the pixel array, said multi-bit digital storage configured to store pixel parameters for each pixel, including a previous pixel value and a pixel-specific change-detection threshold; and
a readout processor connected to said electronic converter and said multi-bit digital storage, said readout processor including a plurality of processing blocks;
wherein:
the event sensor is configured to produce a signal stream comprising event data in reaction to light incident on said pixel array;
said photovoltaic converter and said electronic converter are configured to produce and store a digital current pixel value, which is dependent on an intensity of light incident on said photovoltaic converter;
said readout processor is configured to generate a pixel event value of said event data based on a pixel subtraction result of subtracting said previous pixel value from said current pixel value;
wherein the event sensor is configured to support two basic operation modes, one of which is a temporal contrast event mode, which starts with a pixel-parallel conversion of a light-intensity-dependent analog voltage into the digital current pixel value and storing the digital current pixel value in a converter memory of said electronic converter in a synchronous global-shutter fashion, and wherein then the readout processor reads the current pixel values from the pixel array row by row and simultaneously the corresponding pixel parameters of the same row of pixels from memory, the information transfer between the pixel array, the memory and the readout processor being coordinated by a readout controller, wherein each processing block of the plurality of processing blocks is configured to perform the following processing steps to decide whether to output a temporal contrast event from the corresponding pixel:
  receive a current pixel value and corresponding pixel parameters of the same pixel;
  compute a signed difference between the current and the previous pixel values;
  decide if the signed difference exceeds a positive or negative change-detection threshold, which is the pixel-specific change-detection threshold of the corresponding pixel, if yes, request a temporal contrast event output and update the corresponding pixel parameters, including overwriting the previous pixel value with the current pixel value;
  wherein another basic operation mode is logarithmic intensity frame mode, which starts with capturing a frame of current pixel values and storing the frame in the converter memories of in-pixel ADCs in a synchronous global-shutter fashion, and
wherein the readout processor reads the current pixel values and corresponding parameters row-by-row;
  wherein each processing block performs the following steps to correct inter-pixel gain and offset mismatch in the current pixel value:
  receiving the current pixel value and corresponding parameters of the same pixel;
  converting the current pixel value from Gray code to binary format;
  computing an offset-compensated pixel value by subtracting an offset compensator of the corresponding pixel from the current pixel value;
  computing a final offset-compensated and gain-corrected pixel value by multiplying the offset-compensated pixel value with a gain correction factor of the corresponding pixel.

2. The event sensor according to claim 1, wherein said readout processor is configured to overwrite said stored previous pixel value with said current pixel value, every time a pixel event value has been generated.

3. The event sensor according to claim 1, wherein said electronic converter comprises an analog to digital converter and is configured to produce said current pixel value, which is logarithmically dependent on the intensity of light incident on said photovoltaic converter.

4. The event sensor according to claim 3, wherein said electronic converter comprises a current to voltage converter, wherein the current to voltage converter is a logarithmic converter and the analog to digital converter is a linear converter or the current to voltage converter is a linear converter and the analog to digital converter is a logarithmic converter.

5. The event sensor according to claim 1, wherein said pixel array is composed of a width number of pixel columns and a height number of pixel rows and a pixel parameter memory composed of one multi-bit digital storage for each of said width number times height number of pixels,
  wherein said readout processor comprises said width number of processing blocks, each processing block of said plurality of processing blocks being configured to process one of said pixel columns, or
  wherein said readout processor comprises said width number, multiplied by an integer, of processing blocks, each processing block of said plurality of processing blocks being configured to process a subset of one of said pixel columns, or
  wherein said readout processor comprises said width number divided by an integer of processing blocks, each processing block of said plurality of processing blocks being configured to process multiple of said pixel columns.

6. The event sensor according to claim 1, wherein said multi-bit digital storage is configured to further store a past event timestamp for the corresponding pixel, wherein said readout processor is configured to generate and/or output said pixel event value on a condition that said past event timestamp is older than a predetermined time interval with respect to the current timestamp.

7. The event sensor according to claim 1, wherein said readout processor is configured such that generating said pixel event value is one processing option among two or more processing options determined by a processing option parameter.

8. The event sensor according to claim 7, wherein said readout processor is configured to process a first pixel or all pixels in a first group of pixels of said pixel array according to a first processing option and to process a second pixel or all pixels in a second group of pixels of said pixel array according to a second processing option.

9. The event sensor according to claim 7, wherein said readout processor is configured such that said two or more processing options comprise a generation of a logarithmic intensity at said pixel, which is a value that is logarithmically dependent on the intensity of light incident on said photovoltaic converter.

10. The event sensor according to claim 9, wherein said multi-bit digital storage is configured to further store an offset compensation value, wherein said readout processor is configured to take into account said offset compensation value when generating said logarithmic intensity.

11. The event sensor according to claim 7, wherein said multi-bit digital storage is configured to further store a processing option parameter for the corresponding pixel, wherein said readout processor is configured to process said current pixel value according to said processing option parameter for the corresponding pixel and said readout processor is configured such that said two or more processing options comprise a calibration mode, wherein said current pixel value is outputted by said readout processor unprocessed.

12. The event sensor according to claim 7, wherein that said multi-bit digital storage is configured to further store a processing option parameter for the corresponding pixel, wherein said readout processor is configured to process said current pixel value according to said processing option parameter for the corresponding pixel and said readout processor is configured such that said two or more processing options comprise simultaneously generating a logarithmic intensity at said pixel, which is a value that is logarithmically dependent on the intensity of light incident on said photovoltaic converter, and a pixel event value at said pixel based on a pixel subtraction result of subtracting said previous pixel value from said current pixel value.

13. The event sensor according to claim 1, wherein said multi-bit digital storage is configured to further store a gain correction factor, wherein said readout processor is configured to take into account said gain correction factor when generating said pixel event value and/or said logarithmic intensity.

14. The event sensor according to claim 1, wherein said photovoltaic converter and said electronic converter together occupy a joint physical region or volume in said pixel array.

15. The event sensor according to claim 1, wherein said readout processor is configured to process one row or multiple rows or part of one row of pixels of said pixel array in parallel.

16. A method for producing a signal stream comprising event data in reaction to light incident on a pixel array, comprising the following steps:
produce and store a digital current pixel value, which is dependent on an intensity of light incident on a photovoltaic converter of each pixel of said pixel array, by an electronic converter connected to said photovoltaic converter;
provide for each pixel of said pixel array pixel parameters, including a previous pixel value and a pixel-specific change-detection threshold stored in a multi-bit digital storage corresponding to said pixel;
generate a pixel event value of said event data based on a pixel subtraction result of subtracting said previous pixel value from said current pixel value by a readout processor connected to said electronic converter and said multi-bit digital storage, said readout processor including a plurality of processing blocks; and
perform a pixel-parallel conversion of a light-intensity-dependent analog voltage into the digital current pixel value and storing the digital current pixel value in a converter memory of said electronic converter in a synchronous global-shutter fashion and then reading the current pixel values from the pixel array row by row and simultaneously the corresponding pixel parameters of the same row of pixels from memory in a temporal contrast event mode, the information transfer between the pixel array, the memory and the readout processor being coordinated by a readout controller,
perform the following processing steps by each processing block of the plurality of processing blocks, to decide whether to output a temporal contrast event from the corresponding pixel:
receive a current pixel value and corresponding pixel parameters of the same pixel;
compute a signed difference between the current and the previous pixel values;
decide if the signed difference exceeds a positive or negative change detection threshold, which is the pixel-specific change-detection threshold of the corresponding pixel, if yes, requesting a temporal contrast event output and update the corresponding pixel parameters, including overwriting the previous pixel value with the current pixel value;
capture a frame of current pixel values and store the frame in the converter memories of in-pixel ADCs in a synchronous global-shutter fashion in logarithmic intensity frame mode, and
read the current pixel values and corresponding parameters row-by-row;
perform the following steps by each processing block, to correct inter-pixel gain and offset mismatch in the current pixel value:
receive the current pixel value and corresponding parameters of the same pixel;
convert the current pixel value from Gray code to binary format;
compute an offset-compensated pixel value by subtracting an offset compensator of the corresponding pixel from the current pixel value;
compute a final offset-compensated and gain-corrected pixel value by multiplying the offset-compensated pixel value with a gain correction factor of the corresponding pixel.

* * * * *